United States Patent
Liu et al.

(10) Patent No.: US 12,390,308 B2
(45) Date of Patent: Aug. 19, 2025

(54) MULTI-LAYERED DENTAL APPLIANCE

(71) Applicant: SOLVENTUM INTELLECTUAL PROPERTIES COMPANY, Maplewood, MN (US)

(72) Inventors: Richard Y. Liu, Woodbury, MN (US); Daniel J. Skamser, Ham Lake, MN (US); Bhaskar V. Velamakanni, Woodbury, MN (US); Nathaniel I. Lehn, White Bear Lake, MN (US); Mitchell A. Hirsch, Woodbury, MN (US); Lyudmila A. Pekurovsky, Bloomington, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 907 days.

(21) Appl. No.: 17/417,851

(22) PCT Filed: Dec. 30, 2019

(86) PCT No.: PCT/IB2019/061444
§ 371 (c)(1),
(2) Date: Jun. 24, 2021

(87) PCT Pub. No.: WO2020/141440
PCT Pub. Date: Jul. 9, 2020

(65) Prior Publication Data
US 2022/0061961 A1    Mar. 3, 2022

Related U.S. Application Data

(60) Provisional application No. 62/787,009, filed on Dec. 31, 2018.

(51) Int. Cl.
*A61C 7/08* (2006.01)
*B32B 1/00* (2024.01)
(Continued)

(52) U.S. Cl.
CPC ............... *A61C 7/08* (2013.01); *B32B 1/00* (2013.01); *B32B 27/08* (2013.01); *B32B 27/36* (2013.01);
(Continued)

(58) Field of Classification Search
CPC .................. B32B 2250/04; B32B 2250/05
See application file for complete search history.

(56) References Cited

U.S. PATENT DOCUMENTS

| | | |
|---|---|---|
| 4,765,999 A | 8/1988 | Winter |
| 4,791,156 A | 12/1988 | Hostettler |

(Continued)

FOREIGN PATENT DOCUMENTS

| | | |
|---|---|---|
| DE | 202013001392 | 5/2013 |
| EP | 2559746 | 2/2013 |

(Continued)

OTHER PUBLICATIONS https://www.matweb.com/search/datasheet_print.aspx?matguid=bb6e739c553d4a34b199f0185e92f6f7 (Year: 2024).*

(Continued)

*Primary Examiner* — Michael C Romanowski

(57) ABSTRACT

A dental appliance for positioning a patient's teeth includes a polymeric shell with a plurality of cavities for receiving one or more teeth. The polymeric shell includes at least 3 alternating polymeric layers AB, wherein layer A includes a thermoplastic polymer A, layer B includes a thermoplastic polymer B, and the thermoplastic polymer B is different from the thermoplastic polymer A. Each of the thermoplastic polymers A and B have a flexural modulus of about 1.0 GPa to about 4.0 GPa; and each of the thermoplastic polymers A and B have a glass transition temperature ($T_g$) greater than about 40° C.

20 Claims, 4 Drawing Sheets

(51) Int. Cl.
  *B32B 27/08* (2006.01)
  *B32B 27/36* (2006.01)
(52) U.S. Cl.
  CPC ........ *B32B 27/365* (2013.01); *A61C 2201/00* (2013.01); *B32B 2250/05* (2013.01); *B32B 2250/244* (2013.01); *B32B 2250/42* (2013.01); *B32B 2270/00* (2013.01); *B32B 2307/41* (2013.01); *B32B 2307/558* (2013.01); *B32B 2535/00* (2013.01)

(56) References Cited

U.S. PATENT DOCUMENTS

| | | | |
|---|---|---|---|
| 6,183,248 | B1 | 2/2001 | Chishti |
| 6,390,812 | B1 | 5/2002 | Chishti |
| 6,524,101 | B1 | 2/2003 | Phan |
| 6,626,180 | B1* | 9/2003 | Kittelsen ............. A63B 71/085 128/862 |
| 6,746,757 | B1† | 6/2004 | Takagi |
| 7,210,926 | B2 | 5/2007 | Tadros |
| 7,641,828 | B2 | 1/2010 | DeSimone |
| 8,758,009 | B2 | 6/2014 | Chen |
| 8,905,756 | B2* | 12/2014 | Schwartz ................ A61C 7/08 128/862 |
| 9,655,691 | B2 | 5/2017 | Li |
| 9,655,693 | B2 | 5/2017 | Li |
| 10,188,485 | B2 | 1/2019 | Kim |
| 10,376,202 | B2 | 8/2019 | Shah |
| 10,588,717 | B2 | 3/2020 | Chun |
| 10,751,147 | B2 | 8/2020 | Yang |
| 10,864,708 | B2 | 12/2020 | Pudleiner |
| 2002/0051951 | A1* | 5/2002 | Chishti ................... A61C 7/00 433/6 |
| 2004/0224283 | A1 | 11/2004 | Sun |
| 2005/0100853 | A1 | 5/2005 | Tadros |
| 2006/0073433 | A1 | 4/2006 | Anderson |
| 2006/0105285 | A1* | 5/2006 | Jing ......................... A61C 7/00 433/20 |
| 2007/0254256 | A1 | 11/2007 | Farrell |
| 2008/0248438 | A1* | 10/2008 | DeSimone .............. A61C 7/08 433/6 |
| 2009/0061380 | A1 | 3/2009 | Yamamoto |
| 2009/0068453 | A1 | 3/2009 | Chung |
| 2009/0130624 | A1 | 5/2009 | Sun |
| 2011/0020761 | A1† | 1/2011 | Kalili |
| 2013/0122447 | A1 | 5/2013 | Lemchen |
| 2013/0122448 | A1 | 5/2013 | Kitching |
| 2013/0302742 | A1 | 11/2013 | Li |
| 2014/0353543 | A1 | 12/2014 | Wu |
| 2015/0366638 | A1 | 12/2015 | Kopelman |
| 2015/0374464 | A1* | 12/2015 | Stewart .................... A61K 6/16 264/16 |
| 2016/0176165 | A1* | 6/2016 | Liu .......................... C08L 1/00 428/354 |
| 2016/0228215 | A1 | 8/2016 | Li |
| 2016/0256240 | A1 | 9/2016 | Shivapuja |
| 2019/0105881 | A1* | 4/2019 | Stewart .................. B32B 27/08 |
| 2019/0183611 | A1* | 6/2019 | Li .......................... B32B 27/286 |
| 2020/0015937 | A1* | 1/2020 | Stewart ................ A61C 19/066 |
| 2021/0053324 | A1* | 2/2021 | Pudleiner ................ C08L 75/08 |

FOREIGN PATENT DOCUMENTS

| | | |
|---|---|---|
| EP | 2918258 | 9/2015 |
| EP | 2814871 | 11/2019 |
| JP | 2005060353 | 3/2005 |
| JP | 2005060353 A * | 3/2005 |
| JP | 2009000555 A | 1/2009 |
| JP | 2020522405 A | 7/2020 |
| WO | WO 2002-081567 | 10/2002 |
| WO | WO 2005-012390 | 2/2005 |
| WO | WO 2006-015325 | 2/2006 |
| WO | WO 2006-096558 | 9/2006 |
| WO | WO 2007-027861 | 3/2007 |
| WO | WO 2009-015126 | 1/2009 |
| WO | WO 2010-043419 | 4/2010 |
| WO | WO 2011-086384 | 7/2011 |
| WO | WO 2012-123817 | 9/2012 |
| WO | WO 2013-130552 | 9/2013 |
| WO | WO 2013-159102 | 10/2013 |
| WO | 2013171124 A1 | 11/2013 |
| WO | WO 2014-078499 | 5/2014 |
| WO | WO 2015-059709 | 4/2015 |
| WO | WO 2015-172101 | 11/2015 |
| WO | WO 2015-193709 | 12/2015 |
| WO | WO 2017-007962 | 1/2017 |
| WO | 2018/222864 A1 † | 12/2018 |
| WO | WO 2018-222864 | 12/2018 |

OTHER PUBLICATIONS https://www.matweb.com/search/DataSheet.aspx?MatGUID=501acbb63cbc4f748faa7490884cdbca&ckck=1 (Year: 2024).*

Abe et al., "Flexural properties and shock-absorbing capabilities of new face guard materials reinforced with fiberglass cloth." Feb. 1, 2013. *Dent Traumatol.* 29(1): 23-28.

Agarwal, "Long-term Effects of Cleaning Methods on Properties of Vivera and ACE Clear Retainer Materials" (Thesis). 2017. Chicago, Illinois. 71 pages.

Agarwal et al., "Long-term effects of seven cleaning methods on light transmittance, surface roughness, and flexural modulus of polyurethane retainer material." Mar. 2018. *The Angle Orthodontist.* 88(3): 355-62.

Ahn et al., "A new type of clear orthodontic retainer incorporating multi-layer hybrid materials." Sep. 2015. *Korean J Orthod.,* 45(5): 268-72.

Ajaj-Alkordy et al., "Elastic modulus and flexural strength comparisons of high-impact and traditional denture base acrylic resins." Jan. 2014. *Saudi Dent J.* 26(1): 15-18.

Alexandropoulos et al., "Chemical and mechanical characteristics of contemporary thermoplastic orthodontic materials." Nov. 1, 2015. *Australian Orthodontic Journal.* 31(2): 165-70.

Ali et al., "Hardness, Flexural Strength, and Flexural Modulus Comparisons of Three Differently Cured Denture Base Systems." Oct. 2008. *J. Prosthodont.* 17(7): 545-59.

Al Badr et al., "Effect of immersion in different media on the mechanical properties of dental composite resins." Dec. 17, 2016. *International Journal or Applied Dental Sciences.* 3(1): 81-88.

Bhagia et al., "Terephthalic Acid Copolyesters Containing Tetramethylcyclobutanediol for High-Performance Plastics," 2021, ChemistryOpen, 10:830-41.

Calheiros et al., "Flexural properties of resin composites: Influence of specimen dimensions and storage conditions." 2013. *Dent Mater J.,* 32(2): 228-32.

Chung et al., "Flexural Strength of Dental Composite Restoratives: Comparison of Biaxial and Three-Point Bending Test." Nov. 15, 2004.*J Biomed Mater Res B Appl Biomater.,* 71(2): 278-83.

Condo et al., "SEM characterization and ageing analysis on two generation of invisible aligners." Jun. 23, 2021. *BMC Oral Health.* 21(316): 11 pages.

Cramer et al., "Investigation of thiol-ene and thiol-ene-methacrylate based resins as dental restorative materials." Jan. 2010. *Denta Mater*26(1): 21-28.

Cugini et al., "Aspects of Physical Aging, Mechanical Rejuvenation, and Thermal Annealing in a New Copolyester." 2015. 6 pages. [online] [retrieved on Mar. 17, 2022 from https://www.thefreelibrary.com/Aspects+of+physical+aging%2C+mechanical+rejuvenation%2C+and+thermal...- a0425237545].

Curtzwiler et al., "Effect of recycled poly(ethylene terephthalate) content on properties of extruded poly(ethylene terephthalate) sheets." Jun. 23, 2011. *Journal of Plastic Film & Sheeting.* 27(1-2): 65-86.

Czeiszperger et al., "Effective Additives for Improving Abrasion Resistance in Polyurethane Elastomers." 2019. *Materials Science.* 16 pages.

Drobny, Jiri G. Handbook of Thermoplastic Elastomers. Oxford, Elsevier. May 30, 2014. pp. 64, 241, 277-278, and 398-404.

(56) References Cited

OTHER PUBLICATIONS

Eastman Eastalite™ Copolyester MP007F Technical Data Sheet, Eastman Chemical Company. Mar. 29, 2018. [online] [retrieved on Mar. 17, 2022 from https://productcatalog.eastman.com/tds/ProdDatasheet.aspx?product=71093979&pn=Eastalite+Copolyester+MP007F#_ga=2.54609391.574952290.1%E2%80%A6].
Eastman Tritan™ Copolyester MX810 Technical Data Sheet, Eastman Chemical Company. Jun. 12, 2013. [online] [retrieved on Mar. 2, 2022 from https://web.archive.org/web/20161113154331/http://ws.eastman.com/ProductCatalogApps/PageControllers/ProdDatasheet_PC.aspx?product=71072159#ga=1.70532184.977169226.1477503944].
Elkholy et al., "Forces and moments applied during derotation of a maxillary central incisor with thinner aligners: An in-vitro study." Feb. 2017. *Am J Orthod Dentofacial Orthop*. 151(2): 407-15.
Fang et al., "Dynamic stress relaxation of orthodontic thermoplastic materials in a simulated oral environment." 2013. *Dental Materials Journal*, 32(6): 946-51.
Gilbert, "Exact Analytical Interconversion Between Durometer Hardness Scales" Mar. 2017. Abstract only. [online] [retrieved on Mar. 30, 2022 from http://meetings.aps.org/link/BAPS.2017.MAR.T1.220].
Giudice et al., "Dental Materials Coatings: Effect on the Clinical Behavior." Dec. 16, 2020. *Coatings*. 10(12): 3 pages.
Gomec et al., "Effect of resin-based material combination on the compressive and the flexural strength." Feb. 1, 2005 *J Oral Rehabil*., 32(2): 122-27.
Hahn et al., "Torquing an upper central incisor with aligners—acting forces and biomechanical principles." May 12, 2010. *European Journal of Orthodontics*. 32: 607-13.
Hamilton, "Beyond BPA: Court Battle Reveals a Shift inDebate Over Plastic Safety." Feb. 16, 2015. NPR News. [online] [retrieved on Mar. 17, 2022 from https://www.npr.org/sections/health-shots/2015/02/16/385747786/beyond-bpa-court-battle-reveals-a-shift-in-debate-over-plastic-safety]. 15 pages.
Koenig et al., "Comparison of deminsional accuracy between direct printed aligners and thermoformed aligners." Jan. 19, 2022. *The Korean Journal of Orthodontics*. 14 pages.
Kohda et al., "Effects of mechanical properties of thermoplastic materials on the initial force of thermoplastic appliances." May 2013. *Angle Orthod*. 83(3): 476-83.
Kwon et al., "Force delivery properties of thermoplastic orthodontic materials." Feb. 2008. *Am J Orthod Dentofacial Orthop*. 133(2): 228-34.
Legrand et al., "Synthesis and properties of poly(1,4-cyclohexanedimethylene-co-isosorbide terephthalate), a biobased copolyester with high performances." Mar. 6, 2019. *European Polymer Journal*. 115:22-29.
Lohbauer et al., "Flexural fatigue behavior of resin composite dental restoratives." Jul. 2003. *Dent Mater*, 19(5): 435-40.
Lombardo et al., "Stress relaxation properties of four orthodontic aligner materials: A 24-hour in vitro study." Jun. 17, 2016. *Angle Orthod*, 87(1): 11-18.
Monteiro et al., "Evaluation of Linear Polymerization Shrinkage, Flexural Strength and Modulus of Elasticity of Dental Composites." Feb. 7, 2010. *Materials Research*. 13(1): 51-55.
Min et al., "The effect of thickness and deflection of orthodontic thermoplastic materials on its mechanical properties." Jan. 3, 2010. *Korean Journal of Orthodontics*. 40(1): 16-26 (English Abstract Only).
Muncke, "New study tests endocrine disrupting properties ofTritan™." Mar. 18, 2013. Food Packaging Forum. [online] [retrieved on Mar. 17, 2022 from https://www.foodpackagingforum.org/news/new-study-tests-endocrine-disrupting-properties-of-tritan], 4 pages.
Nakano et al., "Development of Biocompatible Resins for 3D Printing of Direct Aligners." Jun. 2019. *Journal of Photopolymer Science and Technology*, 32(2): 209-16.
Nelson et al., "A perspective on emerging polymer technologies for bisphenol-A replacement." Oct. 2012. *Polymer*. 61(10): 1485-91. Abstract only.
Neostar Elastomer FN006 Technical Data Sheet, Eastman Chemical Company. 2022. [online] [retrieved on Mar. 17, 2022 from https://www.eastman.com/Pages/ProductHome.aspx?product=71048639].
Osimitz et al., "Lack of androgenicity and estrogenicity of the three monomers used in Eastman's Tritan™ copolyesters" 2013. *Food and Chemical Toxicology*. 50:2196-2205.
Pfeiffer et al., "Felxural strength and moduli of hypoallergenic denture base materials." Apr. 1, 2005. *J. Prosthet Dent*. 93(4): 372-77.
Process Economic Program Report 213—Copolyesters. May 1995. Abstract and Table of Contents Only. 11 pages.
Ryokawa et al., "The mechanical properties of dental thermoplastic materials in a simulated intraoral environment." 2006. *Orthodontic Waves*. 65: 64-72.
Rokaya et al., "Polymeric materials and films in dentistry: An overview." Nov. 2018. *Journal of Advanced Research*. 14: 25-34.
Ryu et al., "Effects of thermoforming on the physical and mechanical properties of thermoplastic materials for transparent orthodontic aligners." Sep. 2018. *The Korean Journal of Orthodontics*. 48(5): 316-25.
Saen-isara et al., "Comparative Study of the Flexural Strength and Flexural Modulus of Local Made Orthodontic Resins: A Pilot Study." Aug. 2013. *Advanced Materials Research*. 746: 303-07.
Scarfato et al., "Three-layered coextruded cast films based on conventional and metallocenepoly(ethylene/-olefin) copolymers." 2014, *Journal of Plastic Film & Sheeting*, 30(3): 284-99.
Simon et al., "Forces and moments generated by removable thermoplastic aligners: Incisor torque, premolar derotation, and molar distalization." 2014. *Am J Orthod Dentofacial Orthop*.145(7): 728-35.
Srithep et al., "Processing and Characterization of Recycled Poly(ethylene terephthalate) Blends With Chain Extenders, Thermoplastic Elastomer, and/or Poly(butylene adipate- co-terephthalate)." 2011. *Polymer Engineering and Science*. 51(6): 1023-32.
Tritan prepared by CBDO, is it safe? (A Blog edited by Suzhou Yacoo Science Co., Ltd.) [online]. Dec. 1, 2017. [retrieved Mar. 17, 2022 from the internet:https://www.yacoscience.com/blog/tritan-prepared-by-cbdo-is-it-safe-_b18]. 5 pages.
Vieriu et al., "A Comparative Study of Mechanical Properties of Different Types of Fiber Reinforced Composites Used in Periodontal Therapy." Jun. 2015. *Materiale Plastice*. 52(2): 266-71.
Vu et al., "Polycyclic Aromatic Hydrocarbons in the Mainstream Smoke of Popular U.S. Cigarettes." Aug. 17, 2015. *Chem Res Toxicol*. 28(8): 1616-26.
Wang et al., "Copolyesters Based on 2,5-Furandicarboxylic Acid (FDCA): Effect of 2,2,4,4-Tetramethyl-1,3-Cyclobutanediol Units on their Properties." Aug. 24, 2017. Polymers. 9(305): 15 pages.
Wittmann et al., "Multilayer sheets for thermoforming non thermoformable polymers." Aug. 3, 2021. *Journal of Plastic Film and Sheeting*. (0)0: 1-20.
Xu et al., "Advances in polymeric materials for dental applications." 2017. *Polymer Chemistry*. (8)5: 807-23.
Yap, "Comparison of flexural properties of composite restoratives using the ISO and mini-flexural tests." Feb. 2003. Journal of Oral Rehabilitation. 30(2): 171-77.
Yoo et al., "Comparison of flexural strength and modulus of elasticity in several resinous teeth splinting materials." Sep. 30, 2016. *J Dental Rehabil Appl Sci*. 32(3): 169-75. Abstract only.
International Search report for PCT International Application No. PCT/IB2019/061444 mailed on Mar. 13, 2020, 4 pages.
Extended European Search Report for European Application No. EP199068917 dated Sep. 2, 2022, 9 pages.

\* cited by examiner
† cited by third party

MULTI-LAYERED DENTAL APPLIANCE

CROSS REFERENCE TO RELATED APPLICATIONS

This application is a national stage filing under 35 U.S.C. 371 of PCT/IB2019/061444, filed 30 Dec. 2019, which claims the benefit of U.S. Provisional Application No. 62/787,009, filed 31 Dec. 2018, the disclosures of which are incorporated by reference in their entireties herein.

BACKGROUND

Orthodontic treatments involve repositioning misaligned teeth and improving bite configurations for improved cosmetic appearance and dental function. Repositioning teeth is accomplished by applying controlled forces to the teeth of a patient over an extended treatment time period.

Teeth may be repositioned by placing a dental appliance such as a polymeric incremental position adjustment appliance, generally referred to as an orthodontic aligner or an orthodontic aligner tray, over the teeth of the patient. The orthodontic alignment tray includes a polymeric shell with a plurality of cavities configured for receiving one or more teeth of the patient. The individual cavities in the polymeric shell are shaped to exert force on one or more teeth to resiliently and incrementally reposition selected teeth or groups of teeth in the upper or lower jaw. A series of orthodontic aligner trays are provided for wear by a patient sequentially and alternatingly during each stage of the orthodontic treatment to gradually reposition teeth from misaligned tooth arrangement to a successive more aligned tooth arrangement until a desired tooth alignment condition is ultimately achieved. Once the desired alignment condition is achieved, an aligner tray, or a series of aligner trays, may be used periodically or continuously in the mouth of the patient to maintain tooth alignment. In addition, orthodontic retainer trays may be used for an extended time period to maintain tooth alignment following the initial orthodontic treatment.

A stage of an orthodontic treatment may require that a polymeric orthodontic retainer or aligner tray remain in the mouth of the patient for up to 22 hours a day, over an extended treatment time period of days, weeks or even months.

SUMMARY

The present disclosure is directed to orthodontic dental appliances configured to move or retain the position of teeth in an upper or lower jaw of a patient such as, for example, an orthodontic aligner tray or a retainer tray. An orthodontic dental appliance made from a relatively stiff polymeric material selected to effectively exert a stable and consistent repositioning force against the teeth of a patient can cause discomfort when the dental appliance repeatedly contacts oral tissues or the tongue of a patient over an extended treatment time. In addition, the warm and moist environment in the mouth can cause the polymeric materials in the dental appliance to absorb moisture and swell, which can compromise the mechanical tooth-repositioning properties of the dental appliance. These compromised mechanical properties can reduce tooth repositioning efficiency and undesirably extend the treatment time required to active a desired tooth alignment condition. Further, in some cases repeated contact of the exposed surfaces of the dental appliance against the teeth of the patient can prematurely abrade the exposed surfaces of the dental appliance and cause discomfort.

Dental appliances such as orthodontic aligner and retainer trays can be manufactured by thermoforming a polymeric film to provide a plurality of tooth-retaining cavities therein. In some cases the thermoforming process can thin regions of a relatively rigid polymeric film selected to efficiently apply tooth repositioning force over a desired treatment time. This undesirable thinning can cause localized cracking of the thermoformed dental appliance when the patient repeatedly places the dental appliance over the teeth.

In general, the present disclosure is directed to a multi-layered dental appliance such as, for example, an orthodontic aligner tray or retainer tray, that includes multiple polymeric layers. In one embodiment, the dental appliance includes at least two thermoplastic polymers selected to provide maintain a substantially constant stress profile over an extended treatment time, and provide a relatively constant tooth repositioning force over the treatment time to maintain or improve tooth repositioning efficiency, without prematurely cracking from repeated placement on the teeth of a patient. The combination of thermoplastic polymers is also selected to provide other beneficial properties for the dental appliance such as, for example, good stain resistance, low optical haze, and good mold release properties after the dental appliance is thermally formed from a polymeric film.

In some embodiments, additional optional polymer layers in the dental appliance are also included to improve or maintain other beneficial properties of the dental appliance including, but not limited to, one or any combination of the following: hydration blocking, stain resistance, feel against the oral tissues of the patient, or cosmetic properties such as at least one of transparency and haze.

If the dental appliance is thermoformed from a substantially flat sheet of a multi-layered polymeric film, the multi-layered polymeric film can further optionally include rheological modifying layers with polymeric materials selected to reduce thinning caused by the drawdown during the thermoforming process, which can improve durability of the thermoformed dental appliance over a desired treatment time in the mouth of the patient. The multi-layered polymeric film can also include polymeric layers selected to enhance or maintain release from the mold used during thermoforming.

In one aspect, the present disclosure is directed to a dental appliance for positioning a patient's teeth, which includes a polymeric shell with a plurality of cavities for receiving one or more teeth. The polymeric shell includes at least 3 alternating polymeric layers AB, wherein layer A includes a thermoplastic polymer A, layer B includes a thermoplastic polymer B, and the thermoplastic polymer B is different from the thermoplastic polymer A. Each of the thermoplastic polymers A and B have a flexural modulus of about 1.0 GPa to about 4.0 GPa; and each of the thermoplastic polymers A and B have a glass transition temperature ($T_g$) greater than about 40° C.

In another aspect, the present disclosure is directed to method of making a dental appliance, in which a plurality of tooth-retaining cavities are formed in a multilayered polymeric film. The multilayered polymeric film includes at least 3 alternating polymeric layers AB, wherein layer A includes a thermoplastic polymer A, layer B includes a thermoplastic polymer B, and the thermoplastic polymer B is different from the thermoplastic polymer A. Each of the thermoplastic polymers A and B have a flexural modulus of about 1.0 GPa to about 4.0 GPa; and each of the thermoplastic polymers A and B have a glass transition temperature ($T_g$) greater than about 40° C.

In another aspect, the present disclosure is directed to a method of orthodontic treatment that includes positioning a dental appliance around one or more teeth. The dental appliance includes a polymeric shell with a first major surface having a plurality of cavities for receiving one or more teeth, wherein the cavities are shaped to cover at least some of a patient's teeth and apply a corrective force thereto. The polymeric shell includes at least 3 alternating polymeric layers AB, wherein layer A includes a thermoplastic polymer A, layer B includes a thermoplastic polymer B, and the thermoplastic polymer B is different from the thermoplastic polymer A. Each of the thermoplastic polymers A and B have a flexural modulus of about 1.0 GPa to about 4.0 GPa; and each of the thermoplastic polymers A and B have a glass transition temperature ($T_g$) greater than about 40° C.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements.

DETAILED DESCRIPTION

Figure 1:
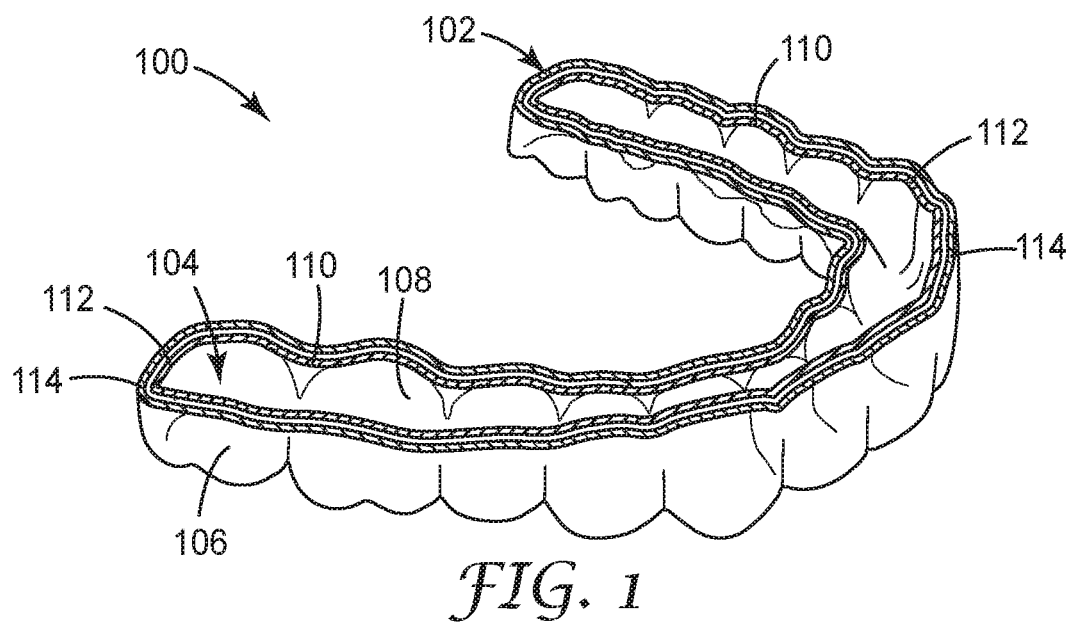
FIG. 1 is a schematic overhead perspective view of an embodiment of a multilayered dental appliance.

A dental appliance such as an orthodontic appliance 100 shown in FIG. 1, which is also referred to herein as an orthodontic aligner tray, includes a thin polymeric shell 102 having a plurality of cavities 104 shaped to receive one or more teeth in the upper or lower jaw of a patient. In some embodiments, in an orthodontic aligner tray the cavities 104 are shaped and configured to apply force to the teeth of the patient to resiliently reposition one or more teeth from one tooth arrangement to a successive tooth arrangement. In the case of a retainer tray, the cavities 104 are shaped and configured to receive and maintain the position of one or more teeth that have previously been aligned.

The shell 102 of the orthodontic appliance 100 is an elastic polymeric material that generally conforms to a patient's teeth, and may be transparent, translucent, or opaque. In the embodiment of FIG. 1, the shell 102 includes at least three alternating polymeric layers. The polymeric layers include polymers AB, wherein A and B are different thermoplastic polymeric materials. The thermoplastic polymers AB are selected to provide maintain a sufficient and substantially constant stress profile during a desired treatment time, and to provide a relatively constant tooth repositioning force over the treatment time to maintain or improve the tooth repositioning efficiency of the shell 102.

In the embodiment of FIG. 1, a polymeric layer 110 forms an external surface 106 of the shell 102, a polymeric layer 112 forms an internal surface 108 of the shell 102, and a polymeric layer 114 resides between the polymeric layers 110 and 112. The polymeric layers 110, 112, 114 each include layers of a thermoplastic polymeric material A or B. The thermoplastic polymeric materials in the layers 110, 112, 114 are arranged to alternate such as, for example, in the arrangement ABA or BAB. For example, in the embodiment of FIG. 1, the layer 110 can include polymer A, the layer 114 can include polymer B, and the layer 112 can include polymer A. Or, the layer 110 can include polymer B, the layer 114 can include polymer A, and the layer 112 can include polymer B.

Each of the thermoplastic polymers A and B have a flexural modulus of about 1.0 GPa to about 4.0 GPa, and a glass transition temperature (Tg) greater than about 40° C. In addition, the thermoplastic polymers A and B can be selected to provide particular properties to the shell 102 including, but not limited to, resistance to moisture absorption, resistance to staining, desired optical properties such as, for example, color, visible light transmission, and haze, ease of release from a thermoforming mold used to form the cavities 104, and resistance to cracking following repeated placement over the teeth of the patient.

In various embodiments, each of the polymers A and B have a flexural modulus of about 1 GPa to about 3 GPa, or about 1.5 GPa to about 2.5 GPa. In some embodiments, the flexural modulus of a polymer A, B in a layer 110, 112, 114 in the dental appliance 100 is no greater than twice the flexural modulus of the polymer present in an adjacent layer.

In various embodiments, each of the polymers A and B have a Tg of about 50° C. to about 200° C., or about 70° C. to about 170° C., or about 75° C. to about 150° C. In some embodiments, the difference between the Tg of the polymers A, B in any two adjacent layers 110, 112, 114 in the dental appliance 100 is not greater than about 70° C.

In some embodiments, the layer 110 on the outer major surface 106 of the dental appliance 100 and the layer 112 on the inner surface 108 include the same polymeric layer A or B. In other embodiments, the layer 110 on the outer major surface 106 of the dental appliance 100 and the layer 112 on the inner surface 108 include different polymeric layers A and B.

In some embodiments, the polymers A and B in the each of the layers 110, 112, 114 of the polymeric shell 102 are polyesters, and in some embodiments the polyester in a particular layer may optionally be blended with a polycarbonate (PC). In some embodiments, the polymer A is a polyester and the polymer B is a PC.

In various embodiments, the polymers A and B are chosen from polyethylene terephthalate (PET), polyethylene terephthalate glycol (PETg), polycyclohexylenedimethylene terephthalate (PCT), polycyclohexylenedimethylene terephthalate glycol (PCTg), polycarbonate (PC), and mixtures and combinations thereof. Suitable PETg and PCTg resins can be obtained from various commercial suppliers such as, for example, Eastman Chemical, Kingsport, TN; SK Chemicals, Irvine, CA; DowDuPont, Midland, MI; Pacur, Oshkosh, WI; and Scheu Dental Tech, Iserlohn, Germany. For example, EASTAR GN071 PETg resins and PCTg VM318 resins from Eastman Chemical have been found to be suitable. Suitable polycarbonates (PC) can be obtained from, for example, Covestro AG, Baytown, TX, under the trade designation MAKROLON LTG2623. Suitable polyester and PC blends include, but are not limited to, resins available under the trade designation XYLEX from Sabic, Exton, PA, such as XYLEX X8519.

In one embodiment, the polymer A is PETg and the polymer B is PCTg. In another embodiment, the polymer A is PETg and the polymer B is a blend of a polyester and PC. In another embodiment, wherein the polymer A is PETg and the polymer B is PC.

Figure 2:
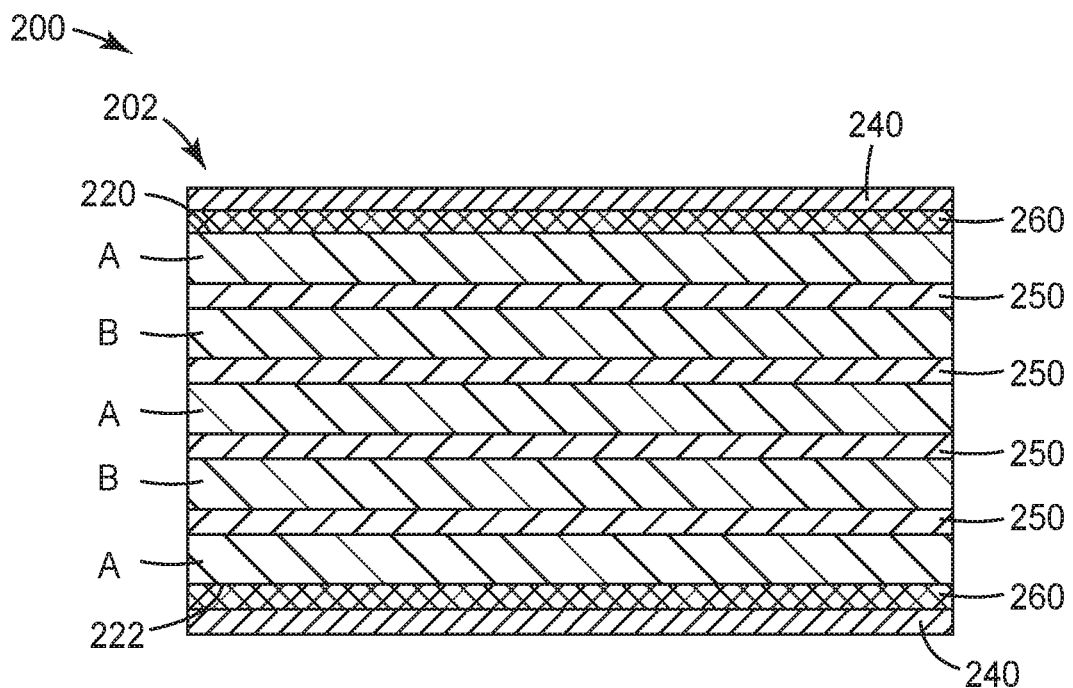
FIG. 2 is a schematic, cross-sectional view of an embodiment of a multilayered dental appliance of FIG. 1.

A schematic cross-sectional view of another embodiment of a dental appliance 200 is shown in FIG. 2, which includes a polymeric shell 202 with a multilayered polymeric structure. The polymeric shell 202 includes alternating layers including thermoplastic polymers AB, and includes the same layer A proximal a first major surface 220 and a second major surface 222. The layers AB can be selected from any of the thermoplastic polymers A and B discussed with respect to FIG. 1, which maintain a substantially constant stress profile during a treatment time, provide a relatively constant tooth repositioning force over the treatment time to maintain or improve tooth repositioning efficiency, resist staining, resist moisture absorption, resist cracking, provide desired optical properties, and/or provide ease of release from a thermoforming mold.

In the embodiment of FIG. 2, the polymeric shell 202 further includes additional optional performance enhancing layers that can be included to improve properties of the shell 202. In various embodiments, which are not intended to be limiting, the performance enhancing layers can be, for example, barrier layers that are resistant to staining and moisture absorption; abrasion-resistant layers; cosmetic layers that may optionally include a colorant, or may include a polymeric material selected to adjust the optical haze or visible light transparency of the polymeric shell 202; tie layers that enhance compatibility or adhesion between packets of layers AB or between layers AB in each packet, elastic layers to provide a softer mouth feel for the patient; thermal forming assistant layers between packets of layers AB or between layers AB in each packet to enhance thermoforming, layers to enhance mold release during thermoforming, and the like.

The performance enhancing layers may include a wide variety of polymers selected to provide a particular performance benefit, but the polymers in the performance enhancing layers are generally selected from materials that are softer and more elastic that the polymers AB. In various embodiments, which are not intended to be limiting, the performance enhancing layers include thermoplastic polyurethanes (TPU) and olefins.

In some non-limiting examples, the olefins in the performance enhancing layers are chosen from polyethylene (PE), polypropylene (PP), polymethylpentene (PMP), cyclic olefins (COP), copolyolefins with moieties chosen from ethylene, propylene, butene, pentene, hexene, octene, C2-C20 hydrocarbon monomers with polymerizable double bonds, and mixtures and combinations thereof; and olefin hybrids chosen from olefin/anhydride, olefin/acid, olefin/styrene, olefin/acrylate, and mixtures and combinations thereof.

For example, in the embodiment of FIG. 2, the polymeric shell 202 includes an optional moisture barrier layer 240 on each external surface, which can prevent moisture intrusion into the polymeric layers AB, and maintain for the shell 202 a substantially constant stress profile during a treatment time. The polymeric shell 202 further includes tie or thermoforming assist layers 250, which can be the same or different, between individual layers AB in each packet of alternating layers. In some embodiments, the tie/thermoforming assist layers 250 can improve compatibility between the polymers in the layers AB as the polymeric shell 202 is formed from a multilayered polymeric film, or reduce delamination between layers AB and improve the durability and crack resistance of the polymeric shell 202 over an extended treatment time. The polymeric shell 202 in FIG. 2 further includes elastic layers 260, which can be the same or different, and can be included to improve the softness or mouth feel of the shell 202. In the embodiment of FIG. 2, the elastic layers 260 are located proximal the major surfaces 220, 222 of the shell 202.

Figure 3:
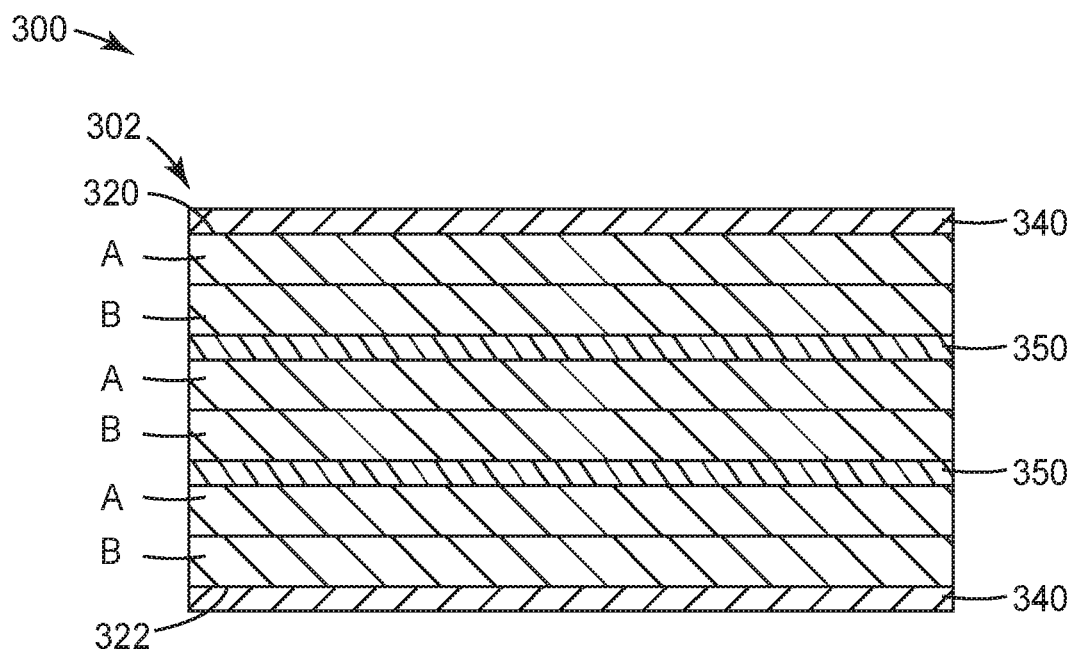
FIG. 3 is a schematic, cross-sectional view of an embodiment of a multilayered dental appliance of FIG. 1.

A schematic cross-sectional view of another embodiment of a dental appliance 300 is shown in FIG. 3, which includes a polymeric shell 302 with a multilayered polymeric structure. The polymeric shell includes alternating layers of thermoplastic polymers AB, and includes a different layer proximal a first major surface 320 and a second major surface 322. The layers AB can be selected from any of the thermoplastic polymers A and B discussed above with respect to FIGS. 1-2.

In the embodiment of FIG. 3, the polymeric shell 302 includes a moisture barrier and stain resistant layer 340 on each external surface, which can prevent intrusion of moisture into the polymeric layers AB and reduce damage to the shell 302 from colored foods (for example, tea, coffee, red wine and the like). The polymeric shell 302 further includes tie or thermoforming assistant layers 350, which can be the same or different, between each packet of alternating layers AB. In some embodiments, the layers 350 can improve compatibility between the polymers in the layers AB as the polymeric shell 302 is formed from a multilayered polymeric film, or reduce delamination between layers AB during the treatment time.

Figure 4:
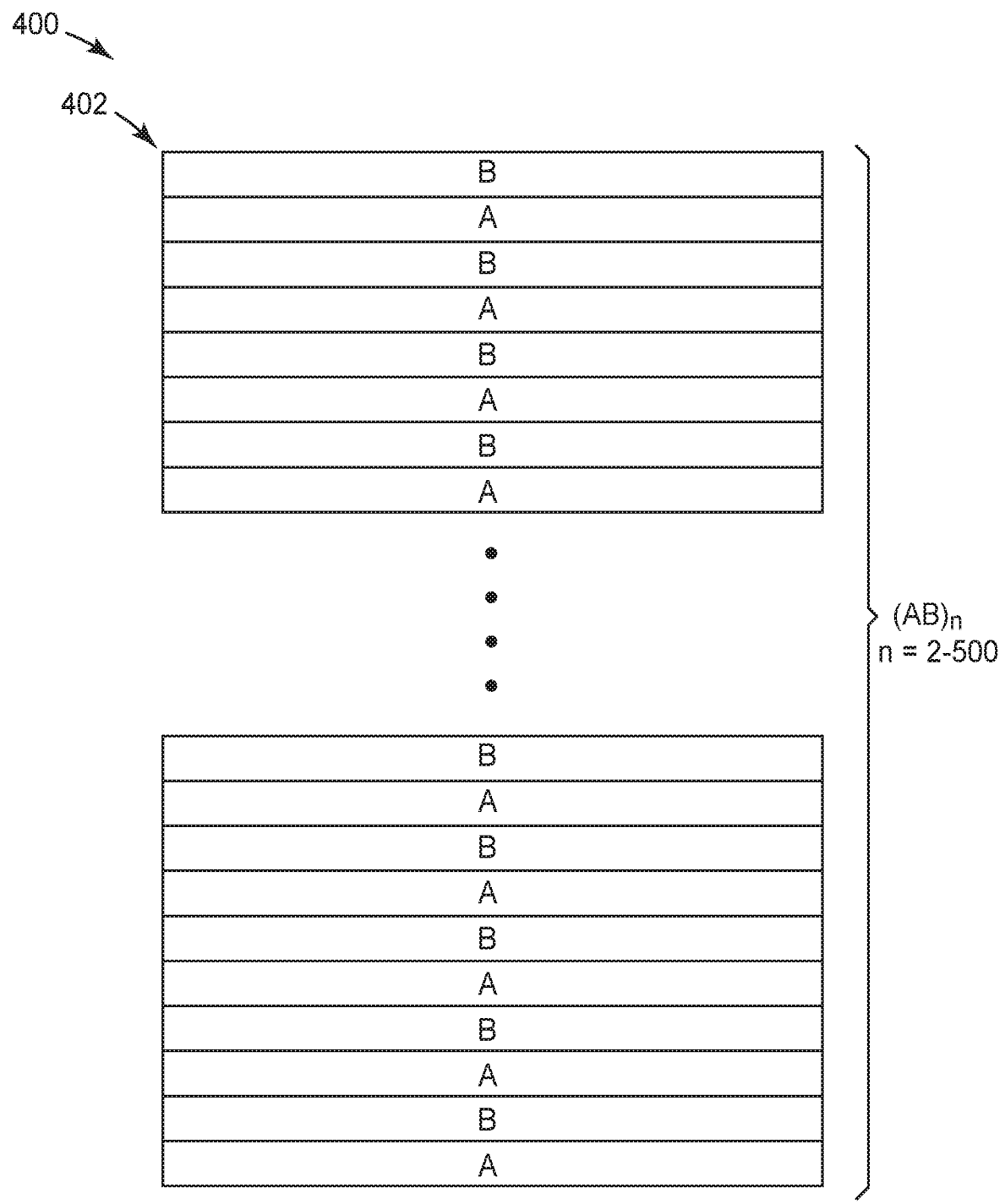
FIG. 4 is a schematic, cross-sectional view of an embodiment of a multilayered dental appliance of FIG. 1.

A schematic cross-sectional view of another embodiment of a dental appliance 400 is shown in FIG. 4, which includes a polymeric shell 402 with a multilayered polymeric structure $(AB)_n$, wherein n=2 to about 500, or about 5 to about 200, or about 10 to about 100. The layers AB, which include different polymers, can be selected from any of the thermoplastic polymers A and B discussed above with respect to FIGS. 1-3. In some embodiments, which are not intended to be limiting, the layers A and B include polymers selected from polyesters, polycarbonates, and blends thereof. In some non-limiting embodiments, the polymers in layers A and B are chosen from polyethylene terephthalate (PET), polyethylene terephthalate glycol (PETg), polycyclohexylenedimethylene terephthalate (PCT), polycyclohexylenedimethylene terephthalate glycol (PCTg), polycarbonate (PC), and mixtures and combinations thereof.

Referring again to FIG. 1, in some embodiments, the polymeric shell 102 is formed from substantially transparent polymeric materials. In this application the term substantially transparent refers to materials that pass light in the wavelength region sensitive to the human eye (about 400 nm to about 750 nm) while rejecting light in other regions of the electromagnetic spectrum. In some embodiments, the reflective edge of the polymeric materials selected for the shell 102 should be above about 750 nm, just out of the sensitivity of the human eye.

In some embodiments, any or all of the layers of the polymeric shell 102 can optionally include dyes or pigments to provide a desired color that may be, for example, decorative or selected to improve the appearance of the teeth of the patient.

The orthodontic appliance 100 may be made using a wide variety of techniques. In one embodiment, a suitable configuration of tooth (or teeth)-retaining cavities are formed in a substantially flat sheet of a multilayered polymeric film that includes layers of polymeric material arranged like the configurations discussed above with respect to FIGS. 1-4. The cavities may be formed by any suitable technique, including thermoforming, laser processing, chemical or physical etching, and combinations thereof, but thermoforming has been found to provide good results and excellent efficiency. In some embodiments, the multilayered polymeric film is heated prior to forming the tooth-retaining cavities, or a surface thereof may optionally be chemically treated such as, for example, by etching, or mechanically embossed by contacting the surface with a tool, prior to or after forming the cavities.

Figure 5:
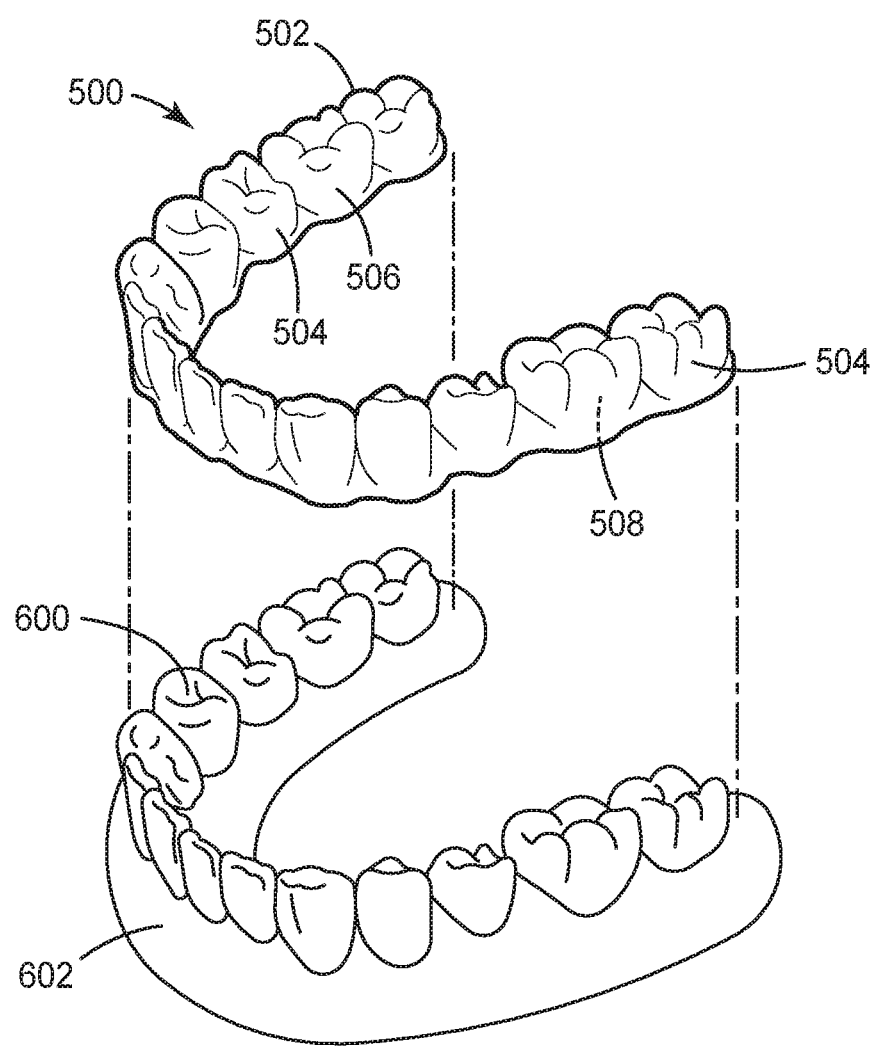
FIG. 5 is a schematic overhead perspective view of a method for using a dental alignment tray by placing the dental alignment tray to overlie teeth.

Referring now to FIG. 5, a shell 502 of an orthodontic appliance 500 includes an outer surface 508 and an inner surface 508 with cavities 504 that generally conform to one or more of a patient's teeth 600, and an external surface 506. In some embodiments, the cavities 504 are slightly out of alignment with the patient's initial tooth configuration, and in other embodiments the cavities 504 conform to the teeth of the patient to maintain a desired tooth configuration. In some embodiments, the shell 502 may be one of a group or a series of shells having substantially the same shape or mold, but which are formed from different materials to provide a different stiffness or resilience as need to move the teeth of the patient. In this manner, in one embodiment, a patient or a user may alternately use one of the orthodontic appliances during each treatment stage depending upon the patient's preferred usage time or desired treatment time period for each treatment stage.

No wires or other means may be provided for holding the shell 502 over the teeth 600, but in some embodiments, it may be desirable or necessary to provide individual anchors on teeth with corresponding receptacles or apertures in the shell 502 so that the shell 502 can apply a retentive or other directional orthodontic force on the tooth which would not be possible in the absence of such an anchor.

The shells 502 may be customized, for example, for day time use and night time use, during function or non-function (chewing vs. non-chewing), during social settings (where appearance may be more important) and nonsocial settings (where the aesthetic appearance may not be a significant factor), or based on the patient's desire to accelerate the teeth movement (by optionally using the more stiff appliance for a longer period of time as opposed to the less stiff appliance for each treatment stage).

For example, in one aspect, the patient may be provided with a clear orthodontic appliance that may be primarily used to retain the position of the teeth, and an opaque orthodontic appliance that may be primarily used to move the teeth for each treatment stage. Accordingly, during the day time, in social settings, or otherwise in an environment where the patient is more acutely aware of the physical appearance, the patient may use the clear appliance. Moreover, during the evening or night time, in non-social settings, or otherwise when in an environment where physical appearance is less important, the patient may use the opaque appliance that is configured to apply a different amount of force or otherwise has a stiffer configuration to accelerate the teeth movement during each treatment stage. This approach may be repeated so that each of the pair of appliances are alternately used during each treatment stage.

Referring again to FIG. 5, an orthodontic treatment system and method includes a plurality of incremental position adjustment appliances, each formed from the same or a different material, for each treatment stage of orthodontic treatment. The orthodontic appliances may be configured to incrementally reposition individual or multiple teeth 600 in an upper or lower jaw 602 of a patient. In some embodiments, the cavities 504 are configured such that selected teeth will be repositioned, while other teeth will be designated as a base or anchor region for holding the repositioning appliance in place as the appliance applies the resilient repositioning force against the tooth or teeth intended to be repositioned.

Placement of the elastic positioner 502 over the teeth 600 applies controlled forces in specific locations to gradually move the teeth into the new configuration. Repetition of this process with successive appliances having different configurations eventually moves the teeth of a patient through a series of intermediate configurations to a final desired configuration.

The devices of the present disclosure will now be further described in the following non-limiting examples.

EXAMPLES

Materials
  PP: polypropylene from Total Petrochemicals USA, Houston, TX: grade FINA 3230
  TPU: thermoplastic polyurethane from Lubrizol, Wickliffe, OH: grade ESTANE ETE 60DS3
  XYLEX: polyester/PC blend from Sabic, Exton, PA, grade: XYLEX X8519PC
  PC: polycarbonate from Covestro, Baytown, TX, grade: MAKROLON LTG2623
  PETg: from Eastman Chemicals, Kingsport, TN, grade: EASTAR GN071
  PCTg: from Eastman Chemicals, grade: VM318
  KRATON G1645: styrene-based linear triblock copolymer thermoplastic elastomer from Kraton Corp, Belpre, OH Properties of Selected Polyesters for Layers AB
Properties of some of the polymeric materials used in the examples below are shown in Table 1.

TABLE 1

| | PETg | PCTg | Xylex | PC |
|---|---|---|---|---|
| $T_g$ | 81° C. | 80° C. | 96° C. | 143° C. |
| Modulus, Flexural | 2.1 GPa | 1.8 GPa | 1.7 GPa | 2.3 GPa |

Summary of Test Procedures
The following test procedures were used in the examples below.

Mold Release
The qualitative inspection test assesses the force required to remove the thermoformed polymeric shell from the tooth mold. If the shell was very difficult to remove, the rating was poor (−−). If the shell was removed with ease, the rating was very good (++). The in-between levels were rated at either Fair (−) or Good (+).

Haze
Haze is defined as the percent of transmitted light that is scattered so that its direction deviates more than 2.5 degrees from the direction of the incident beam as specified in ASTM D1003-13 "Standard Test Method for Haze and Luminous Transmittance of Transparent Plastics." Haze was determined using a HAZE-GARD PLUS meter available from BYK-Gardner Inc., Silver Springs, MD, which was said to comply with the ASTM D1003-13 standard.

The films used to make the polymeric shells were tested on a Haze-Gard Plus. If the film had a haze of less than 5%, it was rated as very good (++). If the haze was above 10%, it was rated as Poor (−−).

Stain Resistance

Coffee was used for the stain test. The sample was soaked in the coffee for 72 hours at 37° C. The resulting color change (DE) was measured before and after soaking using X-Rite 3M Inst. No. 1528196.

If the color change (DE) was larger than 10, the sample was rated as poor (−−). If the color change (DE) was less than 10, the sample was rated as Good (++).

Crack Resistance

The polymeric shells were tested for crack resistance using a manual operation of putting on and taking off the shells from a three-dimensional (3D) printed tooth mold. The polymeric shell was constantly soaked in water at 37° C. The durability of the polymeric shells was rated based on both number of cycles and their failure mode. Specifically, the brittle failure with sharp cracks were not considered to be as desirable than the ductile failure with plastic yielding and stretching.

Comparative Example 1

A single-layer polymeric film with 100% XYLEX resin was extruded through a film die using a pilot scale extruder at a throughput of 15 lbs/hr. The extrusion melt temperature was controlled to be 520° F. (271° C.). The extruded sheet was chilled on a casting roll and collected in a roll. The sheet thickness was controlled at 30 mils (0.76 mm). The film sample was wound into a roll.

The film was then subsequently thermally formed into a dental tray. As summarized in Table 2 below, the dental tray of single-layer rigid XYLEX crack easily under repeated stress testing.

Comparative Example 2

A single-layer film with 100% PC resin was extruded using the same process as in Comparative Example 1, except that the extrusion melt temperature was controlled at 530° F. (277° C.). The sheet thickness was controlled at 30 mils (0.76 mm). The film sample was wound into a roll.

The film was then subsequently thermal formed into a dental tray. As summarized in Table 2 below, the dental tray of single-layer rigid PC cracked easily under repeated stress testing.

Comparative Example 3

A single-layer film with 100% PP resin was extruded using the same process as in Comparative Example 1, except that extrusion melt temperature was controlled at 500° F. (260° C.). The sheet thickness was controlled at 30 mils (0.76 mm). The film sample was wound into a roll.

The film was then subsequently thermal formed into a dental tray. As summarized in Table 2 below, the single-layer rigid PP had a hazy appearance and low corrective force.

Comparative Example 4

A 3-layer ABA (soft/rigid/soft) film was extruded using a pilot scale coextrusion line equipped with a feedblock and film die. The skin layer (A) extruder was fed with TPU resin and the extrusion melt temperature was controlled at 380° F. (193° C.). The throughput was 4.8 lbs/hr (2.2 kg/hr). The core layer (B) extruder was fed with PETg resin and the extrusion melt temperature was controlled at 520° F. (260° C.). The core layer extrusion throughput was 15 lbs/hr (6.8 kg/hr). The extruded sheet was chilled on a cast roll. The overall sheet thickness was controlled at 30 mils (0.76 mm). The 3-layer film sample was wound into a roll.

The film was then subsequently thermal formed into a dental tray. As summarized in Table 2 below, the dental tray of 3-layer film had low correction force and stained easily.

Example 1

A 5-layer ABABA ((PETg/PCTg/PETg/PCTg/PETg) film was extruded using a pilot scale coextrusion line equipped with a feedblock and film die. The skin layer (A) extruder was fed with the first rigid resin, PETg. The skin layer extrusion melt temperature was controlled at 520° F. (271° C.). The throughput was 10 lbs/hr (4.5 kg/hr). The core layer (B) extruder was fed with a second rigid resin, PCTg, and the extrusion melt temperature was controlled at 520° F. (271° C.). The core layer extrusion throughput was 10 lbs/hr (4.5 kg/hr). The extruded sheet was chilled on a cast roll. The overall sheet thickness was controlled at 30 mils (0.76 mm). The 3-layer film sample was wound into a roll.

The film was then subsequently thermal formed into a dental tray. As summarized in Table 2 below, the dental tray of rigid/rigid multilayer film had good crack resistance and good stain resistance.

Example 2

A 5-layer ABABA (PETg/PCTg/PETg/PCTg/PETg) film was made in the same process of Example 1, except the overall film thickness was controlled at 25 mils (0.64 mm).

The film was then subsequently thermal formed into a dental tray. As summarized in Table 2 below, the dental tray of rigid/rigid multilayer film had good crack resistance and good stain resistance.

Example 3

A 5-layer ABABA (PETg/XYLEX/PETg/XYLEX/PETg) film was extruded using a pilot scale coextrusion line equipped with a Feedblock and film die. The skin layer (A) extruder was fed with the first rigid resin, PETg. The skin layer extrusion melt temperature was controlled at 520° F. (271° C.). The throughput was 16 lbs/hr (7.3 kg/hr). The core layer (B) extruder was fed with a second rigid resin, XYLEX, and the extrusion melt temperature was controlled at 520° F. (271° C.). The core layer extrusion throughput was 4 lbs/hr (1.8 kg/hr). The extruded sheet was chilled on a cast roll. The overall sheet thickness was controlled at 30 mils (0.76 mm). The 3-layer film sample was wound into a roll.

The film was then subsequently thermal formed into a dental tray. As summarized in Table 2 below, the dental tray of rigid/rigid multilayer film had good crack resistance and good stain resistance.

Example 4

A 5-layer ABABA (PETg/XYLEX/PETg/XYLEX/PETg) film was extruded using a pilot scale coextrusion line equipped with a feedblock and film die. The skin layer (A) extruder was fed with the first rigid resin, PETg. The skin layer extrusion melt temperature was controlled at 520° F. (271° C.). The throughput was 14 lbs/hr (6.4 kg/hr). The core layer (B) extruder was fed with a second rigid resin, XYLEX, and the extrusion melt temperature was controlled at 520° F. (271° C.). The core layer extrusion throughput was 6 lbs/hr (2.7 kg/hr). The extruded sheet was chilled on a cast roll. The overall sheet thickness was controlled at 30 mils (0.76 mm). The 3-layer film sample was wound into a roll.

The film was then subsequently thermal formed into a dental tray. As summarized in Table 2 below, the dental tray of rigid/rigid multilayer film had good crack resistance and good stain resistance.

Example 5

A 5-layer ABABA (PETg/XYLEX/PETg/XYLEX/PETg) film was extruded using a pilot scale coextrusion line equipped with a feedblock and film die. The skin layer (A) extruder was fed with the first rigid resin, PETg. The skin layer extrusion melt temperature was controlled at 520° F. (271° C.). The throughput was 12 lbs/hr (5.5 kg/hr). The core layer (B) extruder was fed with a second rigid resin, XYLEX, and the extrusion melt temperature was controlled at 520° F. (271° C.). The core layer extrusion throughput was 8 lbs/hr (3.6 kg/hr). The extruded sheet was chilled on a cast roll. The overall sheet thickness was controlled at 30 mils (0.76 mm). The 3-layer film sample was wound into a roll.

The film was then subsequently thermal formed into a dental tray, and the testing results are summarized in Table 2 below.

Example 6

A 5-layer ABABA (PETg/PC/PETg/PC/PETg) film was extruded using a pilot scale coextrusion line equipped with a feedblock and film die. The skin layer (A) extruder was fed with the first rigid resin, PETg. The skin layer extrusion melt temperature was controlled at 520° F. (271° C.). The throughput was 16 lbs/hr (7.3 kg/hr). The core layer (B) extruder was fed with a second rigid resin, PC, and the extrusion melt temperature was controlled at 520° F. (271° C.). The core layer extrusion throughput was 4 lbs/hr (1.8 kg/hr). The extruded sheet was chilled on a cast roll. The overall sheet thickness was controlled at 30 mils (0.76 mm). The 3-layer film sample was wound into a roll.

The film was then subsequently thermal formed into a dental tray, and the testing results are summarized in Table 2 below.

Example 7

A 5-layer ABABA (PETg/PC/PETg/PC/PETg) film was extruded using a pilot scale coextrusion line equipped with a Feedblock and film die. The skin layer (A) extruder was fed with the first rigid resin, PETg. The skin layer extrusion melt temperature was controlled at 520° F. (271° C.). The throughput was 14 lbs/hr (6.4 kg/hr). The core layer (B) extruder was fed with a second rigid resin, PC, and the extrusion melt temperature was controlled at 520° F. (271° C.). The core layer extrusion throughput was 6 lbs/hr (2.7 kg/hr). The extruded sheet was chilled on a cast roll. The overall sheet thickness was controlled at 30 mils (0.76 mm). The 3-layer film sample was wound into a roll.

The film was then subsequently thermal formed into a dental tray, and the test results are summarized in Table 2 below.

Example 8

A 5-layer ABABA (PETg/PC/PETg/PC/PETg) film was extruded using a pilot scale coextrusion line equipped with a feedblock and film die. The skin layer (A) extruder was fed with the first rigid resin, PETg. The skin layer extrusion melt temperature was controlled at 520° F. (271° C.). The throughput was 12 lbs/hr (5.5 kg/hr). The core layer (B) extruder was fed with a second rigid resin, PC, and the extrusion melt temperature was controlled at 520° F. (271° C.). The core layer extrusion throughput was 8 lbs/hr (3.6 kg/hr). The extruded sheet was chilled on a cast roll. The overall sheet thickness was controlled at 30 mils (0.76 mm). The 3-layer film sample was wound into a roll.

The film was then subsequently thermal formed into a dental tray, and the test results are summarized in Table 2 below.

TABLE 2

| Example | Composition | Structure | Mold Release | Haze | Stain Resistance | Crack Resistance |
|---|---|---|---|---|---|---|
| C. Ex. 1 | Xylex 100% | Single Layer Rigid | ++ | ++ | ++ | -- |
| C. Ex. 2 | PC 100% | Single Layer Rigid | ++ | ++ | ++ | -- |
| C. Ex. 3 | PP 100% | Single Layer Rigid | + | -- | n/a | + |
| C. Ex. 4 | TPU/PETg/TPU | Soft/Rigid/Soft | ++ | ++ | -- | + |
| C. Ex. 5 | (PP/G1654)/PP/(PP/G1654) | Soft/Rigid/Soft | -- | ++ | n/a | + |
| Ex. 1 | PETg/PCTg/PETg/PCTg/PETg | Rigid/Rigid/Rigid/Rigid/Rigid | ++ | ++ | ++ | ++ |
| Ex. 2 | PETg/PCTg/PETg/PCTg/PETg | Rigid/Rigid/Rigid/Rigid/Rigid | ++ | ++ | ++ | ++ |
| Ex. 3 | PETg/Xylex/PETg/Xylex/PETg | Rigid/Rigid/Rigid/Rigid/Rigid | ++ | ++ | ++ | ++ |
| Ex. 4 | PETg/Xylex/PETg/Xylex/PETg | Rigid/Rigid/Rigid/Rigid/Rigid | ++ | ++ | ++ | ++ |
| Ex. 5 | PETg/Xylex/PETg/Xylex/PETg | Rigid/Rigid/Rigid/Rigid/Rigid | ++ | ++ | ++ | ++ |
| Ex. 6 | PETg/PC/PETg/PC/PETg | Rigid/Rigid/Rigid/Rigid/Rigid | ++ | ++ | ++ | ++ |
| Ex. 7 | PETg/PC/PETg/PC/PETg | Rigid/Rigid/Rigid/Rigid/Rigid | ++ | ++ | ++ | ++ |
| Ex. 8 | PETg/PC/PETg/PC/PETg | Rigid/Rigid/Rigid/Rigid/Rigid | ++ | ++ | ++ | ++ |

-- Poor
- Fair
+ Good
++ Better (very Good)

Various embodiments of the invention have been described. These and other embodiments are within the scope of the following claims.

The invention claimed is:

1. A dental appliance for positioning a patient's teeth, comprising:
   a polymeric shell comprising a plurality of cavities for receiving one or more teeth, wherein the polymeric shell comprises at least one arrangement of alternating polymeric layers ABA or BAB, wherein:
   layer A comprises a thermoplastic polymer A, wherein the thermoplastic polymer A comprises polyethylene terephthalate glycol (PETg);
   layer B comprises a thermoplastic polymer B, wherein the thermoplastic polymer B comprises polycyclohexylenedimethylene terephthalate glycol (PCTg);
   each of the thermoplastic polymers A and B has a flexural modulus of about 1.0 GPa to about 4.0 GPa; and
   each of the thermoplastic polymers A and B has a glass transition temperature ($T_g$) greater than about 40° C.,
   wherein the polymeric shell includes an outer major surface and an inner major surface, wherein the outer major surface of the polymeric shell includes a set of performance enhancing layers, the set of performance enhancing layers including at least two performance enhancing layers selected from the group consisting of a tie layer, a thermoforming assistance layer, a moisture barrier layer, and a stain-resistant layer, and
   wherein the set of performance enhancing layers includes at least one of: thermoplastic polyurethanes (TPU) or olefins.

2. The dental appliance of claim 1, wherein each of the thermoplastic polymers A and B has a flexural modulus of about 1.0 GPa to about 3.0 GPa.

3. The dental appliance of claim 1, wherein each of the thermoplastic polymers A and B has a $T_g$ of about 50° C. to about 200° C.

4. The dental appliance of claim 1, wherein each of the thermoplastic polymers A and B has a $T_g$ of about 70° C. to about 170° C.

5. The dental appliance of claim 1, wherein the flexural modulus of a thermoplastic polymer in a layer is no greater than twice the flexural modulus of a thermoplastic polymer in an adjacent layer.

6. The dental appliance of claim 1, wherein a difference between the $T_g$ of the thermoplastic polymers in any two adjacent layers is no greater than about 70° C.

7. The dental appliance of claim 1, wherein the polymeric shell comprises five layers, wherein the five layers include the moisture barrier layer, the stain-resistant layer, and three alternating layers comprising the thermoplastic polymer A and the thermoplastic polymer B in an arrangement ABA or BAB.

8. The dental appliance of claim 1, wherein the thermoplastic polymer B further comprises a polycarbonate.

9. A method of making a dental appliance, the method comprising:
   forming a plurality of tooth-retaining cavities in a multi-layered polymeric film to provide the dental appliance, the multilayered polymeric film comprising at least one arrangement of alternating polymeric layers ABA or BAB, wherein:
   layer A comprises a thermoplastic polymer A, wherein the thermoplastic polymer A is polyethylene terephthalate glycol (PETg);
   layer B comprises a thermoplastic polymer B, wherein the thermoplastic polymer B comprises polycyclohexylenedimethylene terephthalate glycol (PCTg);
   each of the thermoplastic polymers A and B has a flexural modulus of about 1.0 GPa to about 4.0 GPa; and
   each of the thermoplastic polymers A and B has a glass transition temperature ($T_g$) greater than about 40° C.,
   wherein the multilayered polymeric film comprises a layer structure (AB)n or (BA)$_n$, and wherein n=2 to 500,
   wherein the multilayered polymeric film includes an outer major surface comprising a plurality of performance enhancing layers selected from the group consisting of a tie layer, a thermoforming assistance layer, a moisture barrier layer, and a stain-resistant layer, and
   wherein the plurality of performance enhancing layers include at least one of: thermoplastic polyurethanes (TPU) or olefins.

10. The method of claim 9, wherein each of the thermoplastic polymers A and B has a flexural modulus of about 1.5 GPa to about 2.5 GPa, and wherein each of the thermoplastic polymers A and B has a $T_g$ of about 75° C. to about 150° C.

11. The method of claim 9, wherein the thermoplastic polymers A and B further comprise any mixtures or combinations of PETg and PCTg.

12. The method of claim 9, wherein the thermoplastic polymer A further comprises a blend of polycarbonate (PC) and PETg, or
   wherein the thermoplastic polymer B further comprises a blend of PC and PCTg.

13. A dental appliance for positioning a patient's teeth, comprising:
   a polymeric shell comprising a plurality of cavities for receiving one or more teeth, wherein the polymeric shell comprises first and second polymeric layers in an alternating arrangement with no intervening polymeric layers between the first and second polymeric layers, wherein:
   the first polymeric layer comprises a thermoplastic polymer A;
   the second polymeric layer comprises a thermoplastic polymer B, wherein the thermoplastic polymer B comprises polycyclohexylenedimethylene terephthalate glycol (PCTg); and
   each of the thermoplastic polymers A and B has a glass transition temperature ($T_g$) greater than about 40° C., and
   wherein the polymeric shell includes an outer major surface and an inner major surface, and wherein the outer major surface and inner major surface are each formed by the thermoplastic polymer A or each formed by the thermoplastic polymer B,
   wherein the polymeric shell includes a set of performance enhancing layers on the outer major surface of the polymeric shell, the set of performance enhancing layers including at least two performance enhancing layers selected from the group consisting of a tie layer, a thermoforming assistance layer, a moisture barrier layer, and a stain-resistant layer, and
   wherein the set of performance enhancing layers includes at least one of: thermoplastic polyurethanes (TPU) or olefins.

14. The dental appliance of claim 1, wherein the thermoplastic polymer A comprises a polyester or blended polyester.

15. The dental appliance of claim 1, wherein each of the thermoplastic polymers A and B has a flexural modulus of about 1.5 GPa to about 2.5 GPa.

16. The dental appliance of claim 1, wherein the polymeric shell includes an abrasion-resistant layer.

17. The dental appliance of claim 1, wherein the polymeric shell is transparent.

18. The method of claim 9, wherein the plurality of tooth-retaining cavities are formed using at least one thermoforming technique.

19. The dental appliance of claim 13, wherein the outer major surface includes the thermoforming assistance layer comprising the TPU.

20. The dental appliance of claim 13, wherein the outer major surface includes the stain-resistant layer.

* * * * *